United States Patent [19]

Kellett

[11] 4,343,969
[45] Aug. 10, 1982

[54] APPARATUS AND METHOD FOR ARTICULATORY SPEECH RECOGNITION

[75] Inventor: Henry G. Kellett, Atkinson, N.H.

[73] Assignee: Trans-Data Associates, Fallington, Pa.

[21] Appl. No.: 174,662

[22] Filed: Aug. 1, 1980

Related U.S. Application Data

[63] Continuation-in-part of Ser. No. 947,944, Oct. 2, 1978, abandoned, which is a continuation-in-part of Ser. No. 781,715, Mar. 28, 1977, abandoned.

[51] Int. Cl.$^3$ .............................................. G10L 1/00
[52] U.S. Cl. ............................................... 179/1 SD
[58] Field of Search ............... 179/1 SD, 1 SB, 1 SC, 179/1 SA; 128/773; 324/77

[56] References Cited

U.S. PATENT DOCUMENTS

| | | | |
|---|---|---|---|
| 3,247,322 | 4/1966 | Savage et al. | 179/1 SD |
| 3,588,363 | 6/1971 | Herscher et al. | 179/1 SD |
| 3,610,831 | 10/1971 | Moshier | 179/1 SD |
| 3,870,817 | 3/1975 | Kalfaian | 179/1 SA |
| 3,919,481 | 11/1975 | Kalfaian | 179/1 SA |
| 4,069,393 | 1/1978 | Martin et al. | 179/1 SD |

OTHER PUBLICATIONS

G. Hellwarth et al., "Automatic Conditioning of Speech", IEEE Trans. Audio and Elec., Jun. 1968, pp. 169-179.
G. White et al., "Speech Recognition Experiments etc.", IEEE Trans. Acoustics, Speech and Sig. Proc., Apr. 1976, pp. 183-188.
J. Flanagan, "Speech Analysis, Synthesis, Perception," Springer-Verlag, 1972, pp. 245-247.

Primary Examiner—Errol A. Krass
Assistant Examiner—E. S. Kemeny
Attorney, Agent, or Firm—William Nitkin

[57] ABSTRACT

An apparatus and method are provided for the recognition of speech produced by various vocal pitches capable of recognition and classification of speech articulation at a real time rate. The apparatus and method assume that articulation of a given sound in an individual's speech can be approximated as the output of a specific linear filter, corresponding to the condition of the individual's vocal tract at the time of articulation, in response to an input of one or more source impulses. The invention selects one of a library of sounds, in response to a speech waveform input, by means of a bank of vocal tract inverse filters, each of which is connected to the speech waveform input. Each vocal tract inverse filter has a complex Fourier transfer function that is the reciprocal of a particular vocal tract transfer function corresponding to a specific speech sound. Thus there is one vocal tract inverse filter for each speech sound as spoken by the particular individual. The assumed vocal tract filters are thus effectively in cascade with the vocal tract inverse filters of the invention so as to form an all-pass filter which can derive the original source waveform.

20 Claims, 19 Drawing Figures

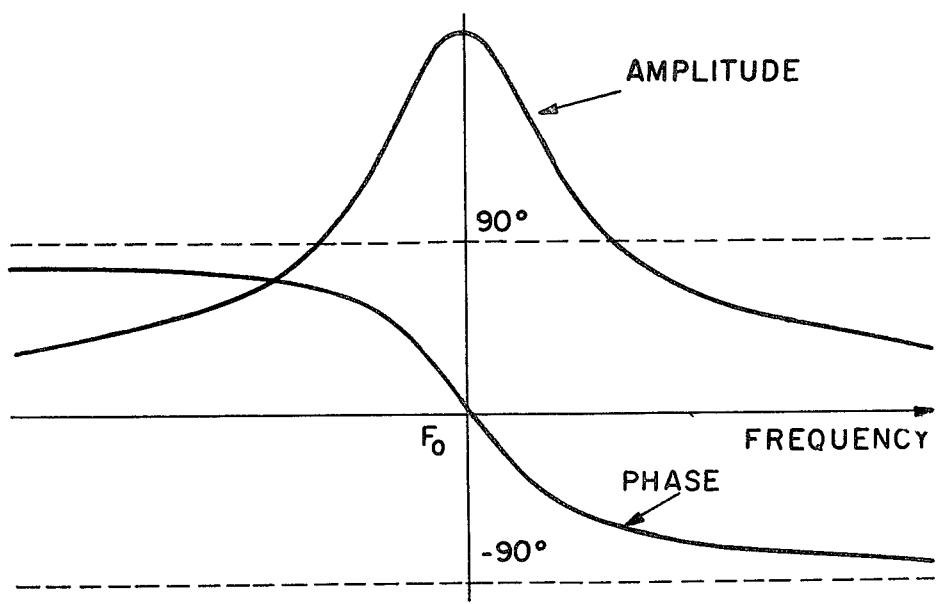
FIGURE 4A
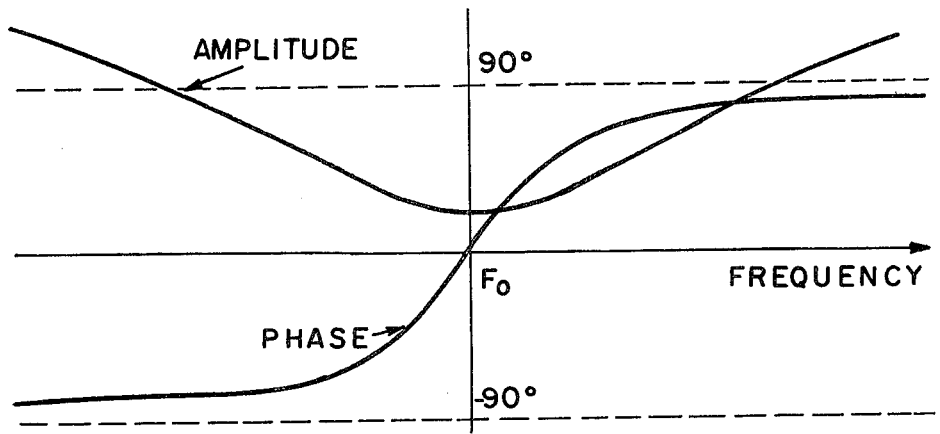
FIGURE 4B
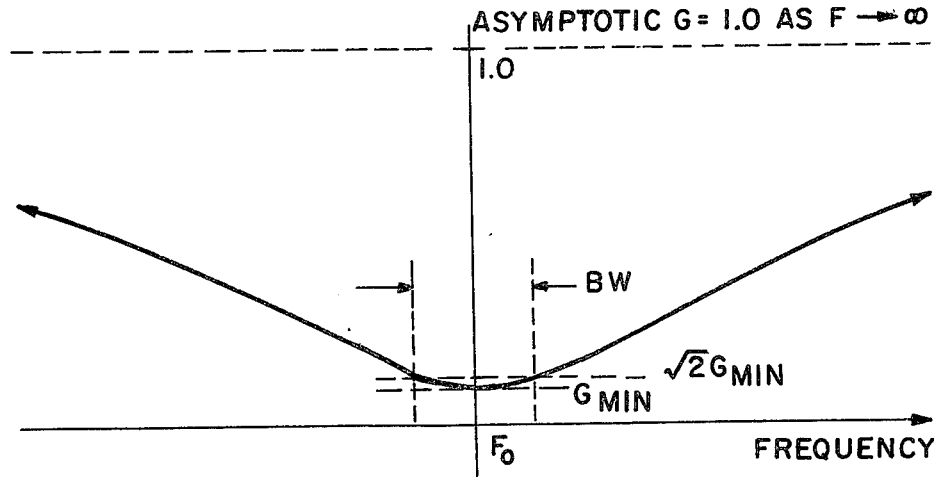
FIGURE 4C  CENTER FREQUENCY = $F_0$   BANDWIDTH = BW
         GAIN OF FILTER = G        NOTCH DEPTH = $G_{MIN}$

FULL-WAVE RECTIFIER

CONSTANT CURRENT SOURCE

COMPARATOR ELEMENT

NOTE:
ELEMENT 122 MATCHED $h_{fe} > 200$
ELEMENT 126 MATCHED $h_{fe} > 100$

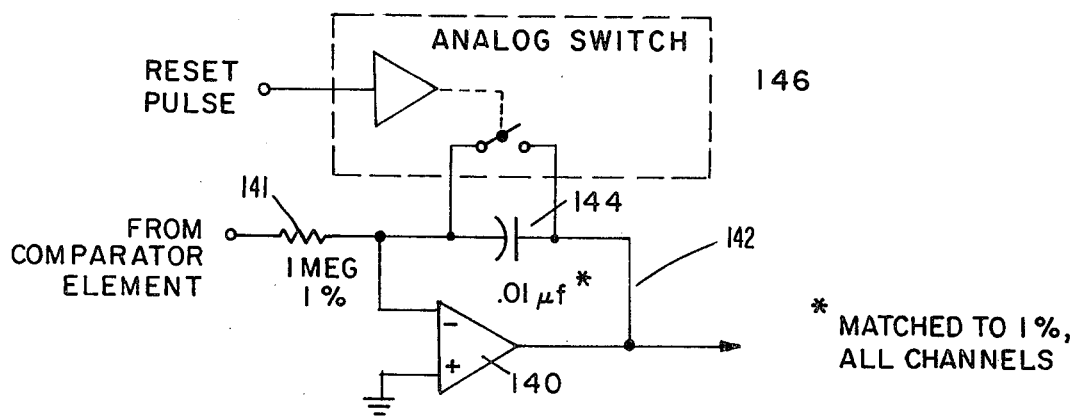
FIG. 9
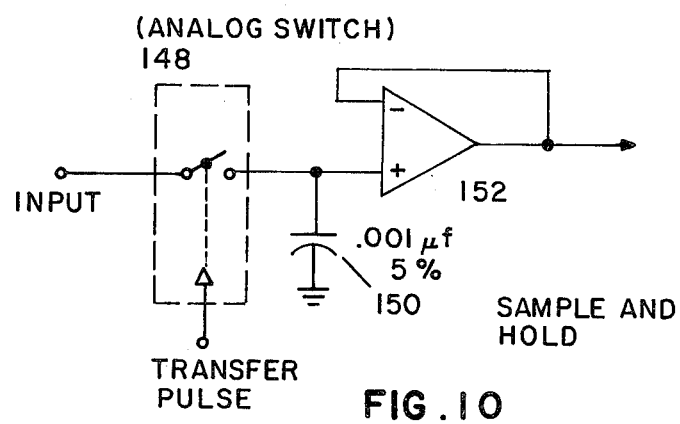
FIG. 10
FIG. 11A
MINIMUM COMPARATOR OUTPUT
(ONE OF n+1 CHANNELS)
FIG. 11B
TRANSFER PULSE
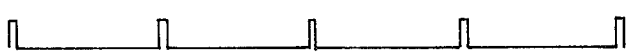
FIG. 11C
INTEGRATOR RESET
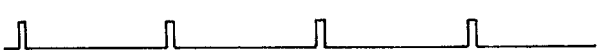
FIG. 11D
INTEGRATOR WAVEFORM
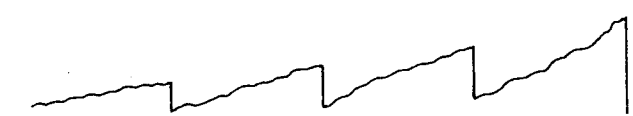
FIG. 11E
INTEGRATED LEVEL
(CAPACITOR 150 VOLTAGE)
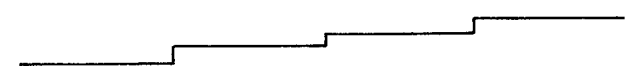

APPARATUS AND METHOD FOR ARTICULATORY SPEECH RECOGNITION

This application is a continuation-in-part of my previously filed application for Apparatus and Method For Articulatory Speech Recognition filed 10/2/78, Ser. No. 947,944 now abandoned, which is a continuation-in-part of my previously filed application for Articulatory Speech Recognition Apparatus filed 03/28/77 having Ser. No. 781,715 now abandoned.

BACKGROUND OF THE INVENTION

1. Field of the Invention

The present invention relates to (i) the determination of vocal tract acoustic properties by analysis of speech waveforms and to (ii) classification of speech waveforms according to vocal tract transfer functions so as to associate each waveform segment with a given articulatory condition.

2. Description of the Prior Art

It has long been known that vowels are roughly characterized by their patterns of resonances usually called formants. It was variously felt that a vowel could be accurately characterized by one, two, three or more formants depending upon the researcher. In the 1940's, equipment was devised which pictured formants and their movements during the articulation of all types of speech. Formants were observed not only in vowels, but in most or all speech elements or phonemes. Extensive data was published on average formant frequencies and relative intensities of men, women and children covering the first three formants believed adequate by the authors to represent all speech. Pattern matching methods were devised for comparison of formant frequencies and movements against known stored references. These efforts have continued until the present time with limited success, but useful in certain applications.

More sophisticated means of processing formant patterns have made very slow progress toward the promise of speech recognition by machine. In parallel with overall spectral matching methods, related formant tracking techniques were devised, in which formant peaks are tracked by electronic circuitry or computer programs. Formant frequency and in some cases amplitude are converted to voltage or graphic form for further matching and analysis. Also in parallel with these efforts, experiments were conducted into direct waveform matching known as cross-correlation, indirect time waveform matching known as autocorrelation, and in time waveform feature extraction such as voice-unvoice, zerocrossing rate, symmetry, envelope and its slope, to name a few. These methods have produced limited success in restricted applications, but have not met with the expected outstanding successes hoped by experimenters.

More recently, research has turned toward linear predictive coding methods. Popularity of these methods seem to arise from their facility of computer implementation. These lines of research essentially duplicate work that has been done with electrical hardware and analyzed by Fourier and Laplace transformation methods. Finally one line of recent research illustrated by Moshier, U.S. Pat. No. 3,610,831, has used weighted and summed delayed speech signals to achieve in one case a rudimentary inverse filter recognition method.

Research and development in speech has followed lines of analysis and characterization which were used extensively in the development of communication systems such as amplitude modulation, frequency modulation, suppressed carrier, single sideband, and pulse modulation of various types. Speech belongs to a class which may be called cavity modulation and about which little mention has been found in the literature of communication.

The above-mentioned speech recognition methods generally utilize concepts devised for the more conventional communication techniques. As a result, vowels are approximated as periodic waveforms, and speech sounds are characterized only by their power or amplitude spectra. Such techniques do not successfully explain and deal with the multiplicity of different waveforms that can occur from one example to another of the same phoneme due to differences in pitch. An important source of waveform variability may be deemed to be the superposition effect wherein the basic waveforms produced by the vocal tract carry over and overlap thereby causing spectral differences depending upon the pattern of voice source impulses as well as the vocal tract configuration. Different articulatory combinations are not therefore easily classifiable when relying upon the power or amplitude spectra.

There is a need for such classifiers capable of operating reliably on a real-time basis, i.e. of classifying at articulatory rates in apparatuses which could respond reliably and accurately to verbal commands. Such classifiers may also permit transmission of speech over channels which are restricted with respect to bandwidth or time or both wherein articulatory categories would be transmitted and subsequently reconverted to speech at the receiving end. It is believed that the present invention, since it classifies sounds according to vocal tract patterns without regard to pitch, is superior to prior art techniques based on the power spectrum which varies with pitch, therefore will make possible the realization of effective and practical speech recognition systems.

SUMMARY OF THE INVENTION

One object of the present invention is to achieve an accurate reduced representation of speech to facilitate, among other possible applications, the automatic analysis of speech for recognition, graphic transcription, and narrow band communication.

Another object of the present invention is to achieve instantaneous speech recognition at the acoustic level and to achieve real-time articulatory classification corresponding to the speech input waveform.

It is a further object of the invention to accomplish the recognition of speech sounds by means that are substantially insensitive to the pitch of the speech input.

It is a further object of the invention to accomplish the recognition of speech sounds by selection from a bank of vocal tract inverse filter channels, the one channel that best reproduces the time pattern of narrow voice source impulses.

It is a further object of the invention to provide an apparatus for classification of speech on the basis of the dominance, of a given instantaneous sound selection, over a specified clock interval (typically 10 milliseconds).

It is a further object of the invention to provide a means for direct recognition of elementary speech sounds from the speech waveform representation, without recourse to statistical methods.

These and other objects are accomplished by the parallel application of a plurality of vocal tract inverse filters. Each of the filters in this bank of filters has a complex Fourier transfer function that is the reciprocal of a particular vocal tract transfer function corresponding to a particular speech sound. (By "sound" is meant one of a set of phoneme segments assumed invariant over a brief interval, typically 10 milliseconds. Of course, these phoneme segments may well be invariant over a longer time interval. As discussed below, time varying phonemes are handled by piecewise approximation on the basis of these phoneme segments.) In particular, the invention is based on the understanding that articulation of a given sound in an individual's speech can be approximated as the output of a specific linear filter, corresponding to the condition of the individual's vocal tract at the time of articulation, in response to one or more input impulses. Accordingly, each filter in the invention is designed to correspond to an hypothesized vocal tract filter, and ideally is designed so that the complex Fourier transfer function of the filter is the reciprocal of the complex Fourier transfer function of the hypothesized vocal tract speech sound filter. Thus the response of a perfect filter, constructed in accordance with the invention, to a non-zero speech sound waveform of the type it was intended to detect would be simply impulses at instants of source excitation and otherwise zero.

Because of the general similarity of voices, a vocal tract inverse filter analyzer designated to correspond with a particular hypothetical vocal tract will operate for a class of voices having vocal tract properties similar to the hypothetical model. However, the use of tuning and the provision of multiple filter banks, as in certain aspects of the invention, can extend the applicability of the invention to the general population.

It will be appreciated that speech elements identified in accordance with this invention are phoneme segments of short duration (typically 10 milliseconds). These speech elements correspond to phonemes only in the case of time invariant (sustainable) phonemes. In a preferred embodiment it is assumed that the bank of inverse filters, when designed to correspond with the sustainable phonemes, is capable also of closely matching (in a piecewise fashion) the time-varying (transitional) phonemes. This assumption corresponds with a piecewise model of articulation in which speech is modeled by the successive activation of members of a bank of time-invariant vocal tract models. The invention should not be construed, however, as restricted to the use of sustainable phonemes in determining criteria of transitional phonemes. There is a vocal tract inverse filter for each hypothesized time-invariant vocal tract model such that when the vocal tract inverse filter correctly matches the time-invariant vocal tract model, its output is a series of one or more impulses corresponding to the source impulses of the articulatory model. Thus a filter can be constructed by the application of well-known filter design methods, that will produce an output approximating a series of impulses in response to an input that is a fricative waveform. Similarly filters can readily be constructed for nasals and vowels. The model is also satisfactory for plosives, diphthongs (by piecewise approximation), glides (in some cases also by piecewise approximation), semivowels, and affricates (by piecewise approximation). Thus many phoneme types may be detected and represented by sequences of the above described speech elements.

The model of speech sound recognition employed by the invention relates to a model of speech production comprising the sequential activation of members of a bank of impulse-driven, time-invariant linear vocal tract models (each model corresponding to a given speech sound) whereby speech is the sum of waveforms emanating from these models, therefore providing a continuous waveform representation. By the principle of superposition, the waveform response of a linear vocal tract model will thus correspond to the summation of responses due to the several input impulses. In view of this model for synthesis of speech, there is a related method for linear analysis thereof. That is, to the extent that, in response to a non-zero input, the output from a particular channel is a series of narrow inpulses with substantially zero signal between the inpulses, the sound corresponding to this channel must have been present at the input. In accordance with the invention, therefore, the input of each filter in the bank of filters is connected to the speech waveform input. The output of each filter can then be examined to determine which output has the smallest absolute value. Generally the filters can be designed so that when a filter channel has the smallest output at a given time, there is usually present at the input of the filter bank at that time the waveform of the sound such filter was designed to detect.

In order to help assure that the sound selected is in fact the sound of the waveform which is present at the input, a preferred embodiment of the invention determines which filter's output is minimum in absolute value for the greatest total time over a given short interval of time, and the associated sound is specified as the sound present at the input. Typically the interval of time over which the predominant sound is picked is in the vicinity of 10 milliseconds.

A preferred embodiment of the present invention further incorporates means to preemphasize the basic speech spectral function and thereby amplify the higher frequencies with respect to the low frequencies. The total vocal spectrum is therefore essentially flattened so that no one particular range will unduly influence the analysis. It is understood that the preemphasis filter function is thereby part of each vocal tract inverse filter, and therefore must be treated as such in design of the inverse filter bank. Also automatic level control is utilized to keep speech input signals at a constant peak level over timed intervals.

It will be appreciated that an apparatus constructed in accordance with the invention disclosed herein is capable of functioning with substantial insensitivity to the pitch content of the speech input. This result is apparent upon reflection of the consequences of the model upon which the invention is based. The invention assumes that the vocal tract forms a linear system during the articulation of a given speech sound (albeit a different linear system for each speech sound). The sound is thus the response of such a linear system to a series of input impulses. In accordance with the model then, pitch can be understood essentially as the pattern of source impulses that are input to the hypothetical linear filter system that is attributable to the vocal tract during the articulation of a given sound. By virtue of the "all-pass" nature of the linear filter system in combination with its inverse, this same pattern of source inpulses is recovered at the output of a vocal tract inverse filter whose complex Fourier transform is reciprocally matched to the hypothetical linear filter system. The presence of a pattern of narrow source impulses at one channel output is detected by means insensitive to the frequency of occurrence of these impulses. As a result, the output of an apparatus constructed in accordance with the invention is substantially independent of pitch.

Owing to the pitch independence of the invention, and the generally similar means for articulation of speech sounds by many speakers, the present invention as previously described for one speaker can be applicable to a broad class of speakers, for example, the adult male. Other classes such as females and children have speech characterized by formant center frequencies generally proportional to those measured for an adult male. Where desirable, the speech elements of these additional classes can be accommodated by including additional filter channels in parallel with those designed for the adult male. It is thus possible to include several, for example, four, additional alternative channels for each articulatory element represented in the bank of vocal tract inverse filter channels. These additional channels based on typical vocal tract size variations provide a means of accomplishing speech recognition over the range of speaker variations of the general population.

It is believed that the present invention is a substantial advance in the art of speech recognition to comprise a substantially more reliable reduced representation of speech information. Further features and advantages of the present invention will become apparent from the following drawings and descriptions thereof.

BRIEF DESCRIPTION OF THE DRAWINGS

FIG. 4a shows typical amplitude and phase plots for a single resonator representing the transfer function of a single vocal formant.

FIG. 4b shows a corresponding amplitude and phase plot of a formant antiresonance filter, whereby the combination of the formant resonance and antiresonance elements produce an all-pass characteristic.

FIG. 4c shows the parameters used in the design of an antiresonance filter element in accordance with a preferred embodiment of the apparatus of the invention as shown in FIG. 1. Asymptotic gain G may be unity, and $G_{min}$ may be typically 0.20 G.

FIG. 9 is a schematic diagram of an integrator, utilized to measure total active time of a bi-level input signal over a low frequency clock interval (typically 10 milliseconds), including means to discharge the integrator in response to narrow discharge pulses, all in accordance with a preferred embodiment of the apparatus of the invention as shown in FIG. 1.

FIG. 10 is a schematic diagram of a simple sample and hold circuit, which transfers an integrated signal to a capacitor in response to a narrow transfer pulse (said transfer completed prior to the beginning of the integrator discharge operation) and produces a low inpedance representation of the stored signal, in accordance with a preferred embodiment of the invention as shown in FIG. 1.

FIGS. 11A-E illustrates the development of one of the n waveform inputs to maximum comparator 22 of FIG. 1 and shows how the rapid-response bi-level output of minimum comparator 18 of FIG. 1 is processed to produce a steady signal level representing the total cumulative active time of the particular channel over a timed articulatory interval.

DESCRIPTION OF SPECIFIC EMBODIMENTS

Figure 1:
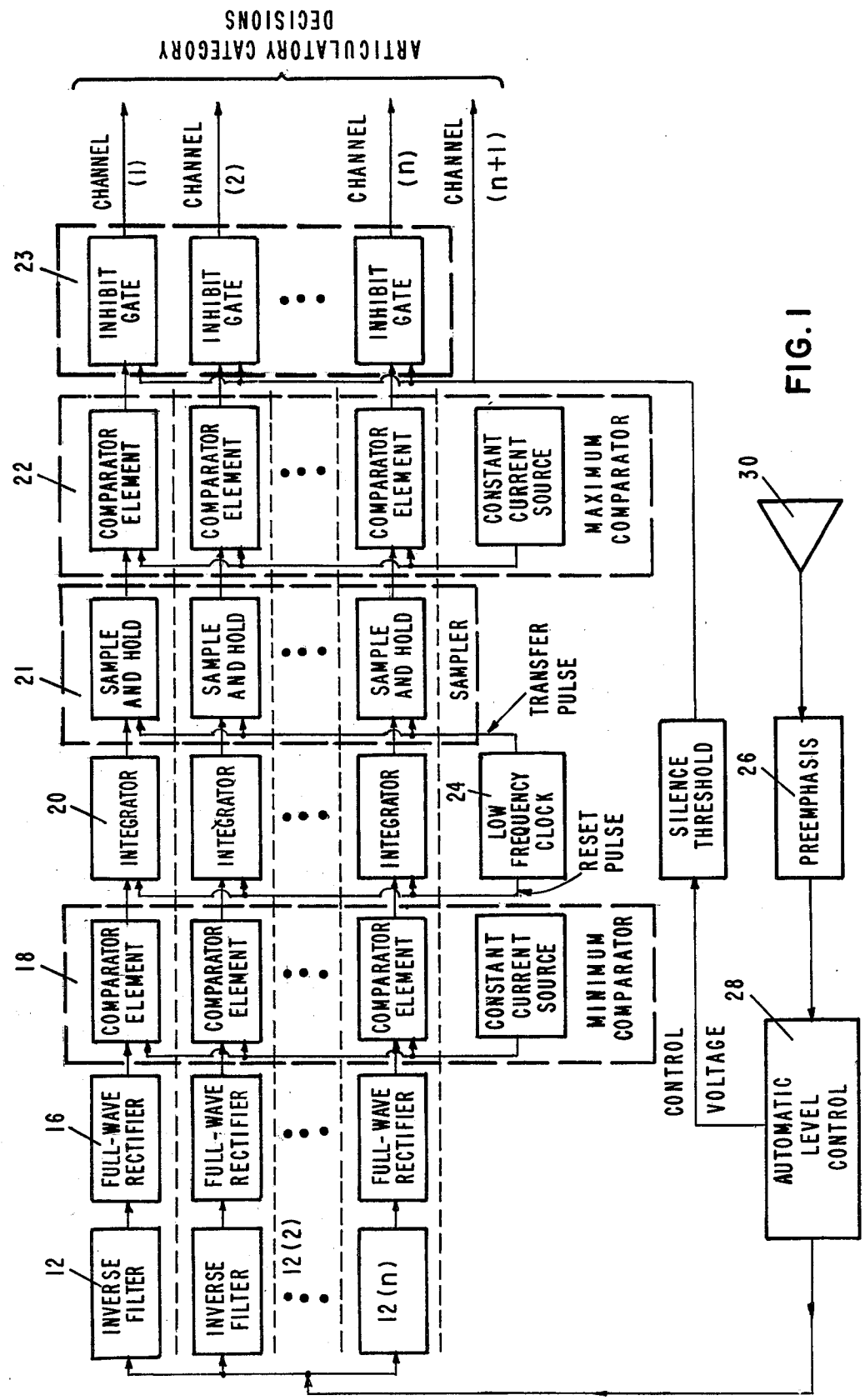
FIG. 1 is a schematic diagram of a preferred embodiment of the apparatus of the present invention for the recognition and classification of articulatory elements illustrating the parallel channels and apparatus utilized to discriminate articulatory elements.

Referring now in detail to the respective Figures, a schematic diagram of the essential elements of a preferred embodiment of the present apparatus for the recognition and classification of speech articulatory elements is illustrated in FIG. 1. The apparatus includes means for instantaneous recognition and selection of a particular candidate vocal tract transfer function and means for timed classification and selection of the recognized transfer function.

The instantaneous recognition of speech sounds is accomplished with a bank of a plurality of vocal tract inverse filters denominated collectively by reference number 12 (1 . . . n). The vocal tract inverse filter bank may consist of "n" parallel inverse filter channels in number, each channel collectively consisting of at least one complex anti-resonance element filter. Typically inverse filter bank 12 will consist of ten to one hundred filter channels; each of these channels is connected to the common speech input. Each vocal tract inverse filter channel has a transfer function that is the reciprocal of the complex transfer function of a particular resonance condition of the vocal tract when the speaker articulates a given sound.

The signal at each vocal tract inverse filter channel 12 (1 . . . n) output is instantaneously converted to a signal indicative of the absolute value thereof by one of a bank of full-wave rectifiers collectively denominated by reference numeral 16 and individually denominated by reference numerals 16($j$) ($j=1, \ldots, n$). Each full-wave rectifier 16($j$) ($j=1, \ldots, n$) corresponds to like numbered vocal tract inverse filter 12($j$) in the same channel j.

A particular full-wave rectifier output is selected by instantaneous selection means embodied by minimum multiple input current switch comparator 18 having (n) channels 18($j$) ($j=1, \ldots, n$), such selection indicating which particular inverse filter channel has the lowest output amplitude at any instant of time. Comparator 18 achieves recognition of the inverse filter which best suppresses the oscillatory and transient properties of the particular vocal tract filter function hypothesized as appearing in the input speech. The outputs of all comparator channels 18(j) (j=1, . . . n) are zero voltage except for the selected channel. The output of comparator 18 at the selected channel is a voltage greater than zero.

In order to determine the dominant channel for a particular short interval of time (typically 10 milliseconds) corresponding to an articulatory interval, there is provided a bank of (n) integrator channels 20(j) (j=1, . . . n). Each integrator channel 20(j) sums the output of a given channel (j) of comparator 18 over the articulatory interval. The articulatory interval is timed by low frequency clock 24. A transfer pulse from clock 24 arrives at the pulse input of each sample and hold element 21(j) (j=1, . . . ,n) of sampler 21. The signal input of the sample and hold element 21(j) is connected to the output of integrator 20(j). In response to a transfer pulse from clock 24, each sample and hold element 21(j) stores the voltage output of integrator 20(j). Just after this output is stored in element 21(j), the integrator output 20(j) is reset to zero by a reset pulse from clock 24. The integrator then begins a new cycle of accumulating the output from minimum comparator element 18(j).

In the meantime, and continuously, the maximum comparator 22 determines which sample and hold element 21(j) has the greatest stored voltage. In effect, the (n) outputs from maximum comparator 22 are indicative of which of the (n) channels has the smallest signal at the output of rectifiers 16 for the greatest total time over the articulatory interval. These outputs thus comprise a synchronous articulatory decision in that the decision occurs at a regular rate.

The decision is denoted by an output voltage from maximum comparator 22 greater than zero on the selected channel, and zero on all other channels. A new decision is made for each time interval (typically 10 milliseconds) of the low frequency clock.

There is, in addition to the n comparator outputs, an articulatory channel (n+1) which responds when there is silence at the audio input. The input to this channel is a "control" voltage which is ordinarily used internally within the automatic level control element 28. This voltage follows the speech amplitude peaks as measured within each clock interval (typically 10 milliseconds duration). A "silence threshold" produces a "high" output when the control voltage exceeds a level corresponding to a significant speech level. Usually, this is set just above the amplitude at which the automatic level control begins to reduce the signal amplification.

There are also n inhibit gates 23 which inhibit the occurrence of all other articulatory signals when a "silence" condition exists by virtue of the inhibitory signal produced by the silence threshold element. The n+1 channel outputs comprising all articulatory outputs including silence are the articulatory decisions of the invention.

The outputs reflecting this decision may be used as inputs for a device that would comprehend such outputs as a choice of an original articulatory vocal tract resonance pattern, that is, as the articulation of a given speech sound or silence. It should be noted that counters could be substituted in place of the integrators. It has been determined that the timed interval classification process be at a rate comparable with that of the fastest articulation in ordinary speech, such rate being typically 100 hertz or corresponding to intervals of 10 milliseconds each.

Further enabling precise recognition of a particular articulatory filter function but not being necessarily deemed to limit the spirit and scope of the present invention of a means of recognition and classification of articulation, a preemphasis circuit 26 and automatic level control circuitry 28 are used between the speech waveform input 30 and the input to inverse filter bank 12. As previously stated, the preemphasis circuit amplifies higher frequencies with respect to lower frequencies and tends on the average to equalize amplitudes of the various frequency components of the raw speech wave. An overall balance of the average speech spectrum is obtained which facilitates distinguishing the various forms of articulation by transforming the glottal impulse into a narrow pulse representing a delta function, whereby the input waveform transfer function tends to appear as the result of the passive vocal tract without regard to the source. Overlap effects, however, due to recurrent impulse excitation of the passive vocal tract are still present.

Preemphasis circuits are well-known in the recent art in regard to their use in speech processing. The resultant output of the preemphasis still resembles the normal speech waveform character and such output would still be intelligible to the human ear although high frequencies would sound abnormally emphasized.

The preemphasis circuit may have two amplifying stages with each stage acting as a differentiator. The first differentiation takes place when electrical input enters, but this first stage may be limited to differentiation of low frequencies up to 1000 hertz, and revert to linear amplification of frequencies above this. Frequencies greater than 3,000 hertz need not be differentiated and the second differentiator may become a linear amplifier of frequencies above this point. It is important function to accurate classification of speech that comparable average intensities be obtained of all frequencies across the voice spectrum.

Automatic gain adjustment is accomplished by level control 28. Automatic level control 28 keeps the input speech at a relatively constant level thereby obviating the need for ultraprecise recognition and classification channels of wide dynamic range and low noise. It is important that the level control circuitry does not interfere with the transient and oscillatory characteristics appearing in the input waveform. Automatic level control 28 may be of any particular good quality control component common to the art. Automatic level control 28 is intended to regulate peak amplitude while preserving the transient character of the articulatory input waveforms. In operation, level control 28 may divide the input speech waveform by its absolute peak level over a timed, typically 10 millisecond interval corresponding to the highest normal articulatory rate. The absolute value of the peak of the input waveform is therefore measured between two clock pulses and may be used to determine amplification during the entire clock interval. An audio delay equal to the clock interval may be applied in the signal channel following the peak measurement operation and preceding the adjustment of signal amplification. The articulatory rate segments of speech waveforms are thereby adjusted to essentially a constant peak level while not losing their characteristic transient properties. The divider may be a component such as an AD7513 or equivalent used in conjunction with well-known components such as absolute value circuits and field effect transistors which are capable of discharging a capacitor.

Figure 2:
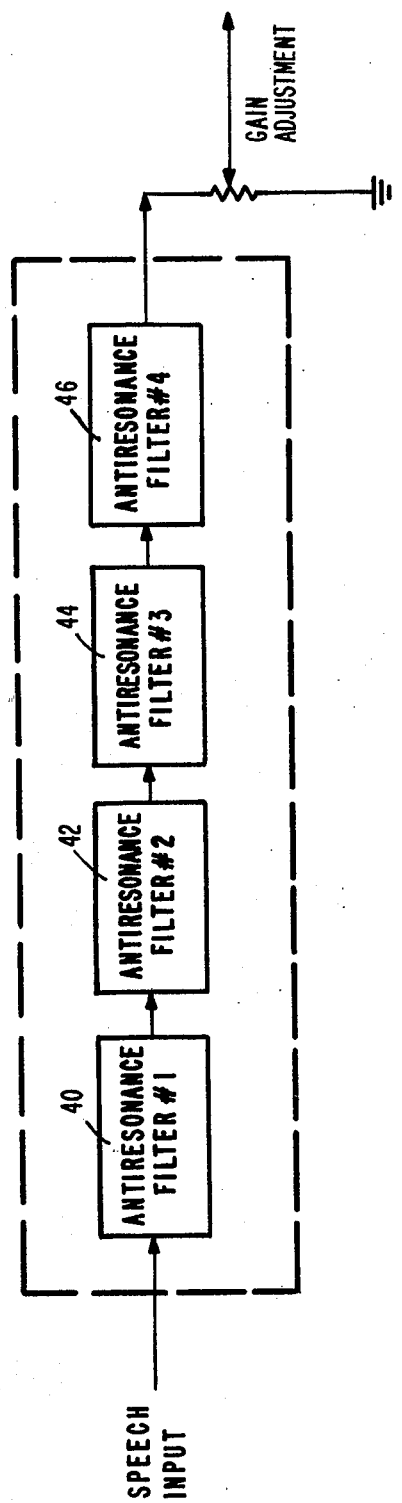
FIG. 2 is a schematic illustration of a typical cascade of formant inverse filters of the filter banks of FIG. 1 utilized for the inverse matching of articulatory elements.

FIG. 2 illustrates a possible configuration of one member of inverse filter bank 12(1, . . . ,n), which in actuality is a cascade of formant antiresonance filters denominated by reference numerals 40-46. Inverse filters 12 (1, . . . n) are, in effect, vocal tract inverse filters since they are designed so that their Fourier transforms approximate the reciprocals of vocal tract transfer functions effective in the articulation of a set of speech sounds. Inverse filter bank 12 receives speech input from automatic level control 28, the speech signal entering each of the inverse filter channels (1, . . . ,n). Each channel has particular combinations of formant antiresonance filters. The cascade of formant antiresonance filters is responsive to the amplitudes and phases of particular formants which are in essence particular resonances of the vocal tract.

Four major formants are known to the art as having importance to recognition, with each having a distinct frequency range. The pattern of formants therefore forms the basis for recognition of the pattern of articulatory resonances. Although single resonances as conveyed by the speech wave may be closely related to several different inverse filters, only one filter will correctly respond to closely match all such oscillatory elements of the speech waveform and will therefore have minimum output between source inpulses until voice articulators move toward a new phonemic representation. Each cascade is thus designed to correspond reciprocally in the Fourier transform domain to a particular pattern of formant resonances. Up to four or more formant antiresonance filters may comprise each channel, but the number of filters necessary will depend upon the pattern of resonances to be matched.

Figure 3:
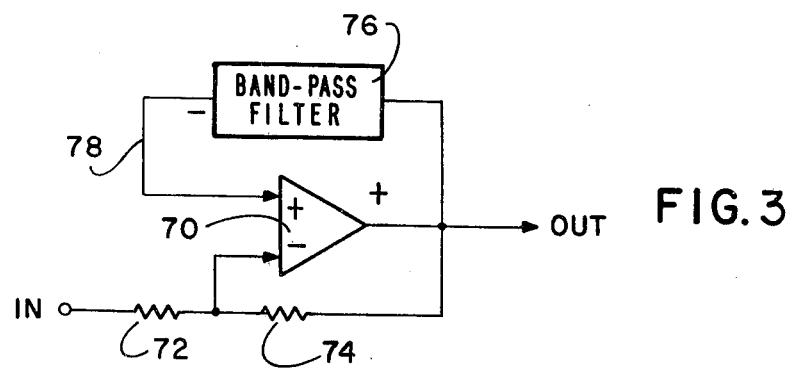
FIG. 3 illustrates a simplified embodiment of a formant inverse filter capable of being utilized in the cascade of filters of FIG. 2.

FIG. 3 illustrates a simple type of formant antiresonance filter, such as filter 40, which may be utilized to make up the cascade of filters. An inverting operational amplifier 70 utilizing resistors 72 and 74 receives input and operates in conjunction with band-pass filter 76 upon the feedback loop 78. This circuitry creates an antiresonance circuit for the type of sound the band-pass filter itself would try to magnify. A series of up to four or more of these formant antiresonance filters act to match a particular condition of the vocal tract as it is represented in the speech wave.

FIG. 4a shows the amplitude and phase characteristics of an hypothetical vocal resonance. This corresponds to the well-known transfer characteristics of a single resonant circuit and is understood by those in the art to reasonably approximate the resonance characteristic of a speech formant.

FIG. 4b shows the amplitude and phase characteristic of a vocal tract antiresonance filter element and corresponds to the transfer characteristic of a circuit such as shown in FIG. 3. It is well-known to those versed in the art that the frequency domain result of cascading two filters produces an amplitude response that is the product of the two amplitudinal responses, and that the phase response is the sum of the two phase responses.

FIG. 4c points out the design parameters that would be used by one versed in the art to construct antiresonance filters having the characteristics of FIG. 4b and corresponding to a given set of speech articulatory elements.

Table 1 sets forth the initial best mode tabulation of filter characteristics for a set of twenty filter channels of the form shown in FIG. 2. The phonemes selected for inclusion are those which, when they occur, are usually sustained in speech independently of either the preceding or the following phonemes. In contrast, for example, the phoneme /e/, as in say, was not included; /e/ when spoken is usually a combination forming the diphthong /εI/. To identify /e/ in the word "say", the analyzer, not having a specific channel for /e/, would be expected to respond with a series of filter channels which most closely matches the frequency characteristics of /e/. The analyzer output for the diphthong would usually read as /εI/. The sequence /εI/ could then be translated in a computer program by means of a sequence-to-phoneme lexicon entry based on the rule that /ε/ followed by /I/ shall be identified as /e/. A subsequent search in a phoneme-to-word dictionary would identify the sequence /sεI/ as the word "say". Although a counter to determine channel duration as well as both the lexicon and dictionary are not part of the Invention, an important aspect of the Invention lies in the simplicity and speed of the computer operations in processing the articulatory decision outputs for the identification of words and phrases.

TABLE 1

| Phoneme | | 1st Formant | | 2nd Formant | | 3rd Formant | | 4th Formant | |
|---|---|---|---|---|---|---|---|---|---|
| | IPA Symbol | Center Freq. | Band-width | Center Freq. | Band-width | Center Freq. | Band-width | Center Freq. | Band-width |
| Vowels | | | | | | | | | |
| she | /i/ | 300 | 30 | 2300 | 120 | 3000 | 150 | 3600 | 210 |
| this | /I/ | 400 | 30 | 1900 | 120 | 2500 | 150 | 3600 | 210 |
| bet | /ε/ | 600 | 30 | 1790 | 120 | 2500 | 150 | 3600 | 210 |
| cat | /ɔ/ | 730 | 30 | 1710 | 120 | 2500 | 150 | 3600 | 210 |
| father | /α/ | 630 | 30 | 1020 | 60 | 2500 | 150 | 3600 | 210 |
| call | /æ/ | 580 | 30 | 870 | 60 | 2500 | 150 | 3600 | 210 |
| took | /U/ | 490 | 30 | 1100 | 60 | 2500 | 150 | 3600 | 210 |
| boot | /u/ | 350 | 30 | 900 | 60 | 2500 | 150 | 3600 | 210 |
| but | /Λ/ | 600 | 30 | 1200 | 60 | 2500 | 150 | 3600 | 210 |
| her | /ʒ/ | 450 | 30 | 1400 | 60 | 1700 | 150 | 3600 | 210 |
| Voiced Fricative Consonants | | | | | | | | | |
| voice | /v/ | 350 | 90 | 1100 | 60 | 2200 | 150 | 3600 | 210 |
| this | /ð/ | 350 | 90 | 1350 | 60 | 2200 | 150 | 3600 | 210 |
| zero | /z/ | 350 | 60 | 1420 | 60 | 2750 | 120 | 3900 | 210 |
| azure | /ʒ/ | 350 | 90 | 1850 | 120 | 2500 | 120 | 3600 | 210 |
| Voiceless Fricative Consonants | | | | | | | | | |
| thin | /θ/ | — | — | 2000 | 120 | 2700 | 120 | 3600 | 210 |

TABLE 1-continued

| Phoneme | | Formant Center Frequencies and Bandwidths for Twenty Filter Channel Analyzer System | | | | | | | |
|---|---|---|---|---|---|---|---|---|---|
| | | 1st Formant | | 2nd Formant | | 3rd Formant | | 4th Formant | |
| | IPA Symbol | Center Freq. | Band-width | Center Freq. | Band-width | Center Freq. | Band-width | Center Freq. | Band-width |
| six | /s/ | — | — | — | — | — | — | 4100 | 120 |
| show | /ʃ/ | — | — | 2500 | 150 | 3200 | 120 | — | — |
| Nasal Consonant | | | | | | | | | |
| no | /n/ | 350 | 90 | 1000 | 60 | 3000 | 210 | 3600 | 210 |
| Glide Consonant | | | | | | | | | |
| won | /w/ | 355 | 30 | 710 | 60 | 2500 | 150 | 3600 | 210 |
| Semivowel | | | | | | | | | |
| will | /l/ | 440 | 30 | 880 | 60 | 2540 | 150 | 3600 | 210 |

Note:
Formant antiresonance filters have asymptotic gain G = 1.0, and $G_{min}$ = 0.20 at their center frequencies FIG. 5, being similar to FIG. 3, illustrates a preferred embodiment of antiresonance filter circuit 80 which operates in the same manner as the above described formant antiresonance filter. A type 741 integrated circuit 82 and its associated resistors 84 and 86 perform the operational amplification function upon the input waveform. Second 741 integrated circuit 88 and its associated resistors 90, 92, 94, and 96 and associated capacitors 98 and 100 perform the formant band-pass filter function which matches the particular vocal tract formant and which has feedback to integrated circuit 82 to provide the waveform antiresonance function. Integrated circuit 88 and associated elements may be classified as a multiple feedback band-pass type filter, the resonance characteristics being dependent upon, in its construction, the center frequency and bandwidth of a particular formant. The frequency and bandwidth of a particular filter may be altered by simultaneously changing capacitors 98 and 100 in proportion. Inverse filter circuits may also be designed to have variable frequencies and bandwidths. To initially set or change frequency and bandwidth for various formants by means of preselecting the resistors and capacitors, reference may be made to numerous handbooks including the well-known Burr Brown references.

Figure 5:
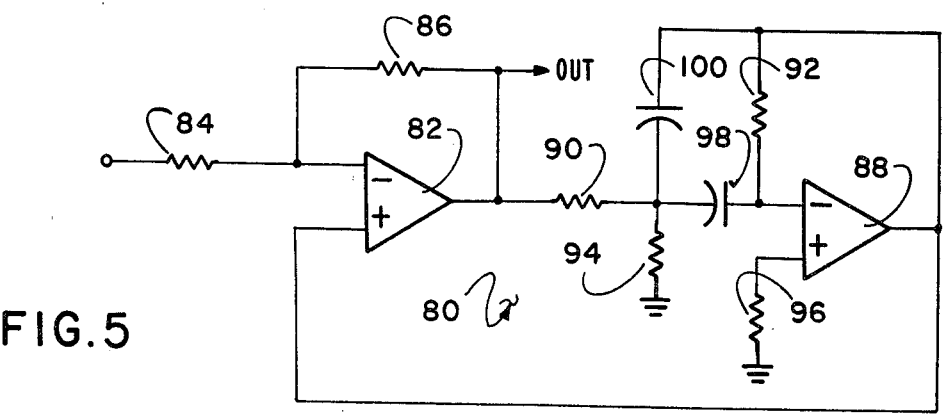
FIG. 5 illustrates the embodiment of a formant inverse filter to be utilized in the cascade of anti-resonance inverse elements of FIG. 2.

In accordance with the present invention each cascade of inverse filters is designed in combination to reciprocally match speech signals arising from certain vocal tract shapes to create a distinct signal upon that channel, which signal approaches a series of delta functions. All formant inverse filter circuits 80 are substantially similar except that the values of the resistors and capacitors of each vary with respect to the particular frequency and bandwidth of the formant that the filter is designed to match. In practice each particular cascade therefore reciprocally matches the frequencies and bandwidths of a particular set of articulatory resonances to produce a minimal output between the low duty cycle source impulses. It should be noted that the formant filter of FIG. 5 is only one filter of the cascade of FIG. 2.

The following material discusses areas of consideration in the design of inverse filter banks in accordance with the invention:

A. How to establish the optimal response of each filter

There are several steps required to establish the optimal filter responses for each speaker. These are:
1. Selection of speech sound library
2. Recording of corresponding impulse responses
3. Computation of Vocal Tract Transfer Functions
4. Computation of Vocal Tract Inverse Filters
5. Implementation of Inverse Filters 1. Selection of Speech Sound Library Input to the present invention originates in a piecewise approximation model of the continuous articulation process. The vocal tract filters of the model may be designed to represent the sustainable phonemes of the English language for example, or a subset of these phonemes. The sustainable sounds of English are (roughly) the vowels (/i/, /I/, /ε/, /æ/, /a/, /ɔ/, /ʌ/, /ɔ/, /U/, /u/), the fricatives (/s/, /ʃ/, /f/, /θ/, /h/), the voiced fricatives (/z/, /v/, /ð/, /ʒ/), and the nasals (/m/, /n/, /ŋ/). Certain of these may be treated as the same sound at the acousticphonetic level, such as /f/ and /θ/, and the nasals /m/, /n/, /ŋ/. It is well known in the art that elements within these latter groups can be distinguished on the basis of articulatory transitions to or from adjoining vowels.

2. Recording of Vocal Tract Impulse Responses

The basic measurement for establishing recognition criteria of a given sound as spoken by a given person is the vocal tract impulse response, and subsequently, by Fourier transformation, the vocal tract transfer function. The vocal tract impulse response may be ascertained from a given person by use of an "artificial larynx" or by a transducer inserted into the vocal tract for the introduction of source impulses into the vocal tract. The resulting output sound may be recorded via microphone a distance from the lips. An important requirement of these methods is that the impulse rate be made low enough that there is no overlap in the filter responses (where the vocal tract is treated as a filter). The impulse response of a filter is by definition its output in response to a single (ideal) impulse. If overlap occurs due to multiple source impulses, the output is an inaccurate representation of the impulse response. It may be noted that the voiced sounds of very low pitched speakers appear as a series of impulse responses with very little overlap, therefore these may be used directly in obtaining the vocal tract transfer function and subsequently the inverse filter bank.

A waveform recorder such as a digital storage oscilloscope with cursors for selecting playback segments may be used to aid in collecting a library of vocal tract impulse responses.

The above methods are particularly appropriate to vowels and other sounds excited at the glottis, but may not be feasible in the case of the fricatives. In these cases we may rely upon published data or upon the outputs of adjustable speech models in which parameters may be adjusted while listening to the output and comparing it with a recording of the target sound. This method may, of course, be used as a primary method of ascertaining parameters for use in designing the inverse filter bank. An engineer versed in the art of speech processing would be able to utilize this method, which has been used for speech synthesis, and particularly in devices known as "terminal analog speech synthesizers".

From the above is obtained a set of impulse responses corresponding to the selected vocabulary of basic speech sounds as spoken by one speaker. The impulse response of each sound will initially have oscillations of large amplitude, which will gradually die out, essentially to zero within a few (10 to 20) milliseconds. An important consideration in the measurement of vocal tract impulse responses is that the response waveform be due to a single source impulse. Any contribution by superposition from neighboring source impulses will produce error in the recorded result.

3. Computation of Vocal Tract Transfer Functions

The above set of vocal tract impulse responses, corresponding to the library of speech sounds are, in fact, rather complicated bursts which may be represented by a voltage as a function of time, and which may be practically approximated by a brief (order of 20 millisecond) segment starting at the beginning of the burst (t=0) and lasting until all oscillations have essentially died out ($t=t_h$). The set of impulse responses may exist in graphic form such as a photograph taken of the impulse response as displayed on a cathode ray tube, or it may be stored in sampled and encoded form in a computer memory.

The vocal tract transfer function is the Fourier transform of the vocal tract impulse response. If the nth impulse response corresponding to the nth member of the speech sound library is denoted by $g_n(t)$, the corresponding vocal tract transfer function $G_n(f)$ is given by $$G_n(f) = \int_0^{t_h} g_n(t) \exp(2\pi j f t) dt.$$

This is a complex function of frequency, and may be written in the form $G_n(f) = A_n(f) + jB_n(f)$. It will be appreciated by those versed in the art that due to the nature of the vocal resonators, $G_n(f)$ is finite and non-zero over the frequency range occupied by speech, therefore will have a complex inverse that is finite and non-zero over the range of speech frequencies.

4. Computation of Vocal Tract Inverse Filters

For a given phoneme having a transfer function $G(f) = A(f) + jB(f)$, the vocal tract inverse filter has a transfer function that is the reciprocal of this, i.e. $G_I(f)$ where $$G_I(f) = \frac{1}{G(f)} = \frac{1}{A(f) + jB(f)} \text{ or } = \frac{A(f) - jB(f)}{(A(f))^2 + (B(f))^2}.$$

Vocal tract transfer functions may be readily computed from the impulse response by one versed in the art of speech processing. Vocal tract transfer functions may be represented as a pair (real and imaginary) of plots in graphic form, or as a complex array of sampled and encoded data in computer memory.

5. Implementation of Inverse Filters

An engineer competent in network synthesis and filter design could readily construct filters closely corresponding to the above complex functions. In a preferred embodiment, the filters are designed as cascades of antiresonance filters where the antiresonances correspond to resonances in the vocal tract transfer function; therefore when, in actual operation there is a match between the vocal tract transfer function and a particular cascade of antiresonance filters, the output will be: 1. a flat spectrum in the frequency domain, and 2. the source impulse in the time domain. Particular elements of the cascade of filters can be designed to inversely match the center frequencies and bandwidths as measured from the corresponding vocal tract transfer function plot.

A method is possible in which an apparatus is constructed according to known properties of the vocal tract, except that center frequencies and banwidths are made adjustable, whereby given sounds could be produced by trial and error adjustment of filter center frequencies and bandwidths. Such adjustment would be in conjunction with means for the continuous repetition of recorded phonemes, specifically a member of the speech sound library.

When a synthesized sound closely resembles the recorded example, its parameters can be measured and noted, specifically the frequencies and bandwidths of the various resonances. The apparatus used for measurement purposes is, in essence, a terminal analog speech synthesizer, the design of which is well known in the art.

The parameters of the various inverse filters can also be ascertained by an apparatus comprising a cascade of adjustable inverse filters. By this method, it is unnecessary to obtain either the vocal tract impulse response or the vocal tract transfer function. Frequencies and bandwidths of the antiresonances are adjusted while an input phoneme is continually repeated by means of a tape loop or waveform recorder. The output may be observed by means of an oscilloscope, and the antiresonances adjusted for minimization of oscillatory properties in the output as observed on the oscilloscope. Such adjustment must be made by trial and error. Each adjustment requires subsequent adjustment until some combination is found at which all oscillatory elements are removed, and only the source waveform remains. This is repeated for the various phoneme elements until all members of the library of inverse filters have been designed.

B. How To Establish the Optimal Response of the Bank of Filters

An important consideration when designing a bank of inverse filters for the purpose of acoustic phoneme recognition is the normalization method by which it is assured that there is no predisposition for any particular output. The normalization method is based upon application of a lossless filter concept to the model of articulation which provides input to the present invention.

1. Normalization of Filter Bank

A theoretical method that can be used to establish optimal response to the bank of filters is based on "lossless filter" theory. Strictly speaking the theory applies to filters that have output energy equal to input energy. The theory may also be applied in the case of constant energy loss, i.e., as in the present application in which losses within all vocal-tract filters may be assumed equal.

Consider a narrow source impulse I(t) such that $$\int_{-\infty}^{\infty} [I(t)]^2 \, dt = 1.$$

When applied as an input to a lossless filter, the response R(t) of the filter is such that $$\int_{-\infty}^{\infty} [R(t)]^2 \, dt = 1.$$

In the case of a second lossless filter which is the reciprocal of the first lossless filter and in cascade with it the response $V_o(t)$ of the cascade to I(t) is such that the source impulses I(t) are reproduced. I.e. $V_o(t) = R(t) * R_I(t) = I(t)$ where * denotes convolution, and $R_I(t)$ is the impulse response of the inverse filter.

The vocal tract model is a bank of lossless filters, and since the inverse filter bank is made up of lossless filters, the overall result at the output of an exactly matched inverse filter is the reproduction of the source impulses with their original energy. Thus, in this channel, there is little waveform activity between the restored impulses. It should be noted here that due to the conditions under which a practical recognizer will function, there is an attenuation and a delay due to the distance of the microphone from the lips, but this is constant for all sounds, therefore unimportant to an understanding of the system's operation.

Care must be taken in the design of the inverse filter bank to conform to lossless filter theory. Transfer function $R_N(f)$ of each complete inverse filter (which may be a cascade of filters) must have the property that $$\int_{-\infty}^{\infty} R_N(f) \overline{R_N(f)} \, df = \text{a constant}$$

where $\overline{R_N(f)}$ is the conjugate of $R_N(f)$. In practice, this corresponds to a constant output power or RMS voltage in response to a constant "white noise" input voltage. A gain adjustment is provided at the output of each filter, and final adjustments are made on the inverse filter bank by the application of white noise to the input, and adjustment of filters to a constant output on an RMS voltmeter.

It will be understood by one skilled in the art that the filter bank is normalized by use of the above procedure on the basis of lossless filter theory. The filter bank so ascertained therefore responds without predisposition to all of the speech sounds for which there is an inverse filter in the bank.

2. Role of Spectral Flattening in Normalization

A discussion of spectral flattening is included here since an understanding of its relationship with the inverse filter bank would be helpful to one versed in the art to build and use a model of the present invention, particularly in the normalization of the filter bank to prevent any predisposition toward particular speech sounds.

It is understood by those skilled in the art of Speech Recognition that the average speech spectrum over many people is not flat but is peaked near the low end of the speech spectrum. This frequency characteristic is understood to arise due to the nature of the glottal acoustic source, moderated somewhat by the radiation characteristic at the lips. The application of spectral flattening tends to make the speech wave appear as if generated by an impulse source.

The preemphasis of spectral flattening function is, in essence, a part of each inverse filter and compensates for the spectral effects of the glottal and fricative source waveforms and the radiation of sound energy by the lips. The preemphasis block of FIG. 1 approximates an inverse filter for the transform of the glottal waveform and the radiation characteristic combined. The vocal tract inverse filters are drawn so as not to reflect this common element of all inverse filter channels.

The application of spectral flattening tends to bring the amplitude of all parts of the spectrum into correspondence with their importance in identification of acoustic phonemes. It also approximates a flat long-term average spectrum to the inputs of the bank of vocal-tract inverse filters, and as a result provides a practical means for adjusting and/or testing the filter channels for overall normalization, namely the application of flat spectrum (white) noise to the filter bank and adjusting gains if necessary to obtain the same RMS output from all channels.

3. Practical Implementation Methods

A filter bank designed such that each member of the filter bank is a lossless filter or each has a constant loss, is already normalized in the sense that predisposition to any sounds in preference to others is minimized. In practice it may be desirable to provide means for testing and/or adjusting the members of the filter bank for proper normalization.

The operation of preemphasis or "spectral flattening" approximates a flat long-term average spectrum to the inputs of the bank of vocal-tract inverse filters. A test for normalization of the filter bank may be understood as a test for equalization of loss (at zero in the ideal case) over the entire bank. Equalization of loss can be tested by the application of a white noise voltage to the filter bank after preemphasis and the measurement of RMS voltage at each filter output. When all RMS outputs are equal, the filter bank is properly normalized, and will respond to input speech sounds without predisposition.

C. Matching The Type of Articulation "Type" of articulation can refer to the various properties of the vocal tract and changes in these properties in the formation of verbal intelligence. Two acoustically important elements of the articulation process are (1) the acoustic source, and (2) the vocal tract configuration acting upon the acoustic source. "Type" of articulation can also refer to types of speech, including language, dialect, and accent, as well as the more personal and expressive speech characteristics such as stressed, whispered, etc.

1. The Model of Articulation

The specification of "type of articulation" most appropriately refers to the nature or type of source, but could be further broken down in terms of place of articulation and other possible descriptors of the physiology involved in speech production. The subject application is based upon a model of articulation for which there is a source and a vocal tract filter associated with each of the distinct sounds of speech. Some speed sounds are the result of articulator motion, but are handled by the model via piecewise approximation, i.e. by activation of a series of the sustainable phoneme models. It will be understood by those versed in the art that the perceptual quality of phonemes made via moving articulators may be simulated by a series of short connected segments taken from sustainable phonemes.

2. Acoustic Source Types

There are three types of sources that are of interest in the articulation of most languages. These are (1) glottal, (2) fricative, and (3) plosive. The glottal source produces a series of quasi-periodic impulses, while the fricative source produces a series of random impulses. The plosive source of the model produces a single impulse. The present invention is a method for the identification of the series of vocal tract filters without regard to the pattern of pitch or source impulses. In the case of sounds produced by the glottal source, the present invention detects the given sound as produced by a given vocal tract configuration by selection of the inverse filter channel that best recovers the source impulses, which may be narrow impulses approximating delta functions. In a preferred embodiment, the detection is via the sensing of minimum waveform activity between the recovered impulses. Since best recovery is not dependent upon the pattern of source impulses, the invention is capable of matching the different types of articulation as produced by the different types of acoustic sources.

3. Articulators

By the understanding of the present invention, vocal articulators move through the various configurations, thereby imparting verbal intelligence to the acoustic signal originating in one of the acoustic sources. In the case of fricatives and plosives, the same member may act as both source and articulator. Articulation is primarily via movement of tongue, lips, and jaw. The tongue forms acoustic cavities with the hard palate, gum ridge and teeth; the lips operate together and against the teeth in the rounding of vowels. The lower jaw moves up and down during the articulation of certain consonants, and is also a factor in forming the characteristic resonances of vowels. Another factor in articulation is the coupling and decoupling of the nasal cavities by the soft palate in the formation of nasal consonants.

The present invention is capable of matching the different types of articulation as produced by vocal tract configuration and changes thereof. There is a vocal tract inverse filter of the invention for directly matching each distinct sustainable phoneme. It is known by those versed in the art that speech sounds made by moving articulators can be closely approximated by a succession of connected segments of the sustainable phonemes, therefore the library of inverse filters is capable of closely matching the articulation due to both steady and moving vocal articulators.

4. Language and Dialect

Since the inverse filter bank is designed to match the distinct sustainable phonemes, it is of course optimized for a particular language and dialect. In some cases, the articulatory elements of two different languages or dialects may be similar enough that only a single filter bank would be needed for both. In other cases, it may be desirable to construct a filter bank optimized to a specific language or dialect.

In the sense that different dialect and language are considered "types" of articulation, they may be matched in one of three ways: (1) by direct use of a filter bank optimized on one language or dialect to approximately match another language or dialect, (2) by modification via addition and/or substitution of filter elements of a filter bank optimized for one language to suitably perform on another language or dialect, or (3) construct a new filter bank optimized to a new language or dialect. By one of these three methods, the invention is capable of matching the various types of articulation as imposed by different languages and dialects.

5. Unusual Forms and Expressive Types

Most modern languages are articulated in basically the same general way, but even within the European Language groups, there are some marked differences, but not in the overall nature of the articulatory process. Differences occur in the use of guttural sounds, glottal stops and groups of consonants. No difficulty is seen in the application of the present invention to these forms. There are, however, whistle, tone, and click language types used by isolated peoples in certain areas of the world; however these cannot be clearly classified as speech, and therefore would not qualify as a "type" of articulation in the present context.

The human can express a wide range of emotional feelings by the tone of his voice, and he can adapt his voice to a variety of acoustic environments. Some of these expressive types are (1) stressed speech, (2) shouting, (3) whining, (4) mumbling, etc. For the most part, these are controlled by tensing various muscles within the vocal tract, thereby changing the glottal waveform and/or the rigidity and precision of the vocal cavities during articulation. The approach that would be taken in the use of the invention to match these different expressive types would be to (1) base the original design on normal speech, (2) test for operation with examples from the various expressive types, and (3) modify, and/or add filter channels to accommodate any speech elements that are not recognized reliably by the initial set. It is possible to design the filter bank on the basis of one particular expressive type should it ever by necessary to maximize performance on that type of speech. It is therefore seen that the invention is capable of matching the various types of articulation arising from emotional and environmental circumstances.

The same basic approach could be taken in the case of whispered speech, although in this case, the sounds that are excited by glottal vibration in normal speech are excited by air passing through the glottal constriction, but the cavity array is the same in both cases and the same filter bank is therefore appropriate to both voiced and whispered speech. The filter bank output of the invention in response to whispered speech is a series of random impulses. The output channel having minimum waveform activity exclusive of recovered narrow source impulses, denotes the recognized articulatory category.

D. Matching the Type of Person's Voice

The invention can match the type of person's voice by one of three procedures:

1. In some cases, a filter bank for one person will perform adequately on another voice type.

2. In some cases, a filter bank for one voice type can be modified by the addition, substitution, or parallel application of filters to perform adequately on another voice type.

3. In some cases, it may be necessary to design an entirely new filter bank to accommodate a substantially unusual voice type.

There are additional methods for accommodating the various types of person's voices:

a. Speaker Category Recognition, whereby a number of filter banks is provided, designed in such a way that one of the filter banks will provide good performance on any one known voice or voice type.

b. Adjustable Filter Bank Recognition, whereby all antiresonances of the filter bank are simultaneously adjustable to compensate for differences in vocal tract size, as would be found between the average man and the average woman for example.

c. Individual Parameter Method, whereby there is provided the equivalent of individual filter adjustment for all antiresonances of the inverse filter bank, and such that the parameters can be adjusted for an individual speaker to achieve optimal performance on that speaker.

E. Matching the Type of Person's Speech Style

1. Pitch and Pitch Inflections

These elements of style are handled by the basic pitch insensitivity of the invention which has been previously described.

2. Articulation Rate

The decision rate of the invention is assumed to be fast enough to follow the fastest of normal articulation rates. The articulatory recognizer therefore provides a sufficiently detailed picture of the articulatory process so higher levels of processing may operate to extract and recognize the full meanings of input utterances.

3. Stress and Distinctness

Stressed speech usually appears as the result of conscious effort to aid the perceiver, and is assumed to be more distinct than unstressed speech. The invention can certainly be designed for stressed or distinct speech, but these are felt to be variates of normal speech, therefore probably recognizable by a system designed for normal speech.

4. Coarse and Whispered Speech

Coarse speech is assumed to be a variate of normal speech, but whispered speech on the other hand substitutes a noiselike random impulse source in the place of the nearly periodic glottal source. The invention has been shown to be insensitive to the pattern of source impulses therefore it is capable of responding to whispered speech.

Figure 6:
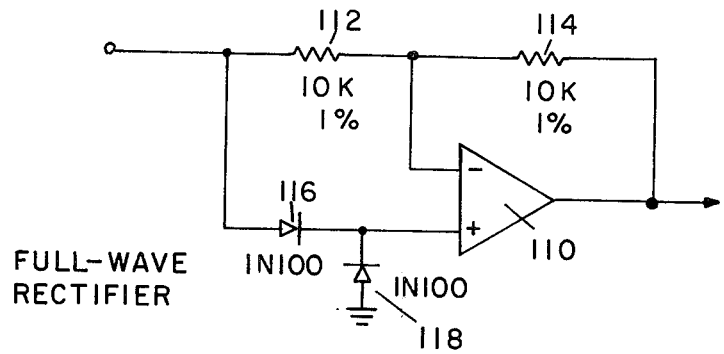
FIG. 6 is a schematic illustration of a full-wave rectifier utilized as an absolute value circuit in accordance with a preferred embodiment of the apparatus of the invention as shown in FIG. 1.

Referring for the moment to FIG. 1, full-wave rectifier 16 changes the modified speech waveforms at the output of the vocal tract inverse filter cascade of its respective channel to unidirectional form. As shown in FIG. 6, the full-wave rectifier 16 of FIG. 1 may be embodied by a 741 type integrated circuit 110 and its associated resistors 112 and 114 and diodes 116 and 118. Full-wave rectifiers provide a signal which makes it possible for comparator 18 to determine which of the inverse filter cascades 12(j) (j=1,...,n) has the smallest absolute value output for any instant of time.

Multiple input current switch comparator 18 of FIG. 1 having (n) channels selects and determines the minimum absolute value circuit output at any instant of time and indicates the channel by its own output signal. At any instant of time only one inverse filter will have a minimum output approaching zero and the one corresponding comparator output will be thereby enabled via the absolute value circuit. In effect, comparator 18 is simply a multiple input current switch.

The purpose of comparator 18 is to continuously and instantaneously select, from the n channels representing the n inverse filter output signals, the one having the smallest absolute value. The signals at the outputs of the n comparators are binary in form, but due to instantaneous operation may contain narrow spikes and pulses of various lengths. The instantaneous comparator should be capable of switching at rates on the order of 5 KHz.

Item 124 is a part of item 18, and is a transistor operating as a constant current source. Details of operation are with reference to FIG. 7. Base to emitter voltage $V_{BE}$ in the "on" condition is $-0.8$ volts typically for silicon PNP transistor type 2N3906. $V_B$ is selected to be two or three volts more negative than $V^+$ by virtue of divider resistors $R_1$ and $R_2$. Then the emitter voltage $V_E$ is given by $V_E = V_B - V_{BE}$ so that constant current $I_c$ developed in $R_3$ is given by $$I_c = \frac{V^+ - V_B + V_{BE}}{R_3}$$

Figure 8:
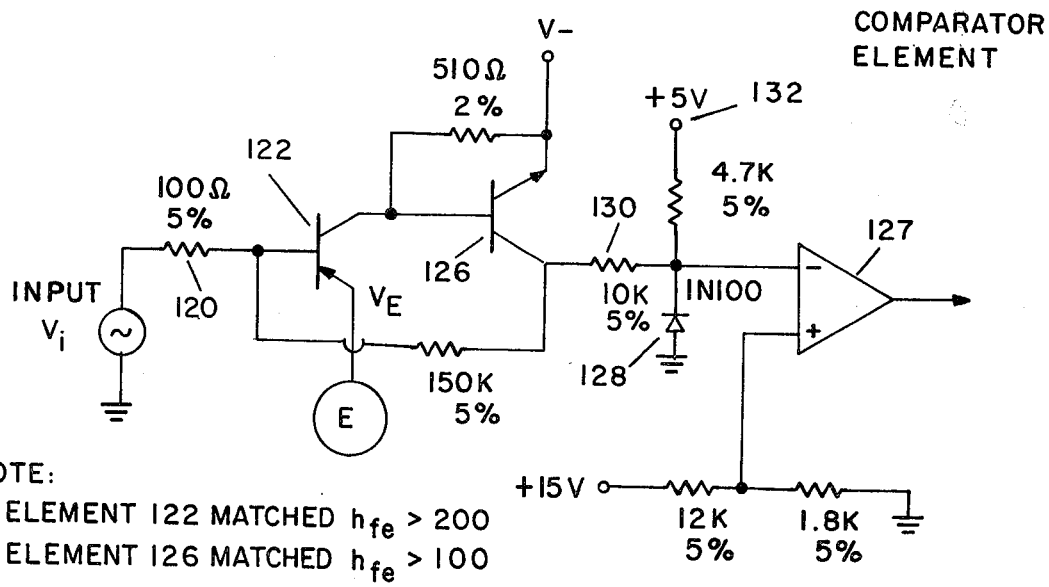
FIG. 8 is a schematic diagram of one member of a bank of n comparator elements in accordance with a preferred embodiment of the apparatus of the invention as shown in FIG. 1.

Due to the high $h_{fe}$ of the transistor type 2N3906 base current $I_B$ is much smaller than load current $I_L$, therefore $I_L \approx I_c$ is the constant current supply for the entire bank of current switch transistors 122 in FIG. 8.

Referring now to FIG. 8, there is shown a comparator element 18(j) of FIG. 1. The emitters of each transistor 122 in the bank of comparator elements are connected to constant current source transistor 124 of FIG. 7. Current switch transistors 122 are also type 2N3906 transistors having $V_{BE} = -0.8$ volts in the "on" condition. One of the input voltages $V_i$ to transistors 122 will be more negative than any of the others, so that $$V_E = \min(V_i) + 0.8 \text{ V}$$

or $$\min(V_i) - V_E = -0.8 \text{ volts.}$$

Base to emitter voltages of all other transistors are given by $$V_i - V_E \leq -0.8 \text{ volts, for } V_i \neq \min(V_i).$$

This is the direction to cut off current flow in these transistors, therefore further increasing current in the transistor having $\min(V_i)$ since total current is constant. The transistor having $\min(V_i)$ as input will tend to conduct most of the current supplied by constant current source transistor 18 and other transistors will have much smaller proportions of the total constant current $I_c$ due to the knee of the characteristic curve of the transistors.

All transistors 122 of FIG. 8 except the one having $\min(V_i)$ as input will be cut off or will have a tendency in that direction. The ones that are cut off will have essentially $V^-$ on their collectors, and this will be applied to bases of corresponding elements 126 which are NPN transistors type 2N3904. Since $V^-$ also appears on the emitters of these transistors, $V_{BE} \approx 0$ and they do not conduct. The transistor 122 that is conducting most heavily will apply a less negative voltage to the base of corresponding transistor 126, causing it to conduct, thereby placing a negative potential on the collector of that one transistor. Positive feedback is applied back to the input of the transistors 122 so that a more solid decision will be made at the sacrifice of having a slight shift of operating point. In essence, the positive feedback corresponds to hysteresis. Because the positive feedback resistor in that diagram is of large ohmic value (typically 150 K$\Omega$) it does not appreciably influence the following level sensing circuitry. It should also be noted that a small ohmic value resistor (typically 100$\Omega$), element 120, is utilized as part of the positive feedback network, and only slightly alters the balance of input signals in order to assure a clean decision of minimum input at every instant of time.

When any element 126 is non-conducting, positive voltage is applied at voltage input 132 through a resistor to the (−) input of integrated circuit comparator 127, which may be a type LM311 or ¼ of a type LM339. The positive voltage applied to the (−) input must be greater (more positive) than the reference potential applied to the (+) input when corresponding element 126 is non-conducting, with the result that output from element 127 is zero.

When an element 126 is conducting, its collector goes negative, essentially to V−, with the result that the contribution of voltage from input 132 is nullified, and a negative potential goes to the (−) input of element 127, causing its output to go fully positive. Diode 128 protects the (−) input from excessively negative voltages.

Integrator bank 20 of FIG. 1 has (n) channels of which one is illustrated by FIG. 9.

Each integrator element as illustrated by FIG. 9 has an input to receive an output from its corresponding minimum comparator element and the integrator element includes a high impedance input operational amplifier 140 with series resistor 141 to the inverting input, and capacitor 144 in feedback loop 142. This circuit is a linear integrator which provides an indication, at the end of a clocked interval of total time, of the comparator channel activation during the clocked interval. Each member of integrator bank 20 has a field effect transistor input operational amplifier type LF 13741 (item 140) with capacitor (item 144) in the feedback loop and an analog switch consisting of ½ of an AD 7513 dual analog switch across the capacitor to discharge it in response to clock reset pulses from clock 24 of FIG. 1. The inverting input will appear as a virtual ground with respect to the charging resistor, therefore integration is linear. The integrated output level will always go negative due to inversion in element 140 since input pulses are always positive or zero. Prior to the end of the articulatory rate clocked interval and resetting of the integrator by analog switch 146, the integrated level at the input of maximum comparator 22 is transferred by means of sample and hold circuitry as illustrated by FIG. 10 to capacitor 150 in that figure, which capacitor holds the level during the next clock interval. The integrated value of the on condition of the preceding minimum comparator 18 is held on capacitor 150 at its entire value for a full clock interval to allow the maximum comparator to select the highest or maximum integrated signal for each articulatory interval thereby identifying the dominant inverse filter channel in one clock interval and displaying the result during the next clock interval. High input impedance operational amplifier 152 produces an output corresponding to the voltage stored on capacitor 150 without substantially discharging it; and such output is connected to the corresponding maximum comparator element. The voltage across capacitor 150 remains until given a new value when analog switch 148 is instantaneously closed by a transfer pulse from clock 24 of FIG. 1.

FIG. 11A shows the waveform that is typical of the bi-level output of an element of the minimum comparator 18. The waveform may have pulses recurring at frequencies up to and exceeding 5 KHz. FIGS. 11B and 11C are narrow clock pulses at the articulatory rate (typically 100 Hz) consisting of transfer and reset pulses respectively. These are used with integrator 20 in the determination of total active time of the minimum comparator channel during the clock interval. FIG. 11D illustrates the output waveform of integrator 20. This integrator is reset to zero by the above narrow reset pulse, and subsequently integrates the waveform of FIG. 11A. Upon arrival of the transfer pulse, the integrated level is transferred through analog current switch element 148 to capacitor 150 of FIG. 10. Voltage follower 152 of FIG. 10 is an FET high input impedance type LF 13741, thus the integrated level of capacitor 150 appears at its output during the next clock interval as shown in FIG. 11E.

The waveform analysis shown above provides a method of obtaining a measurement of active time of the minimum comparator channel and providing input to the maximum comparator. The small amount of "dead time" due to resetting of integrators is of little consequence so long as the transfer-reset sequence is completed in an interval that is very short compared with the articulatory interval.

Figure 7:
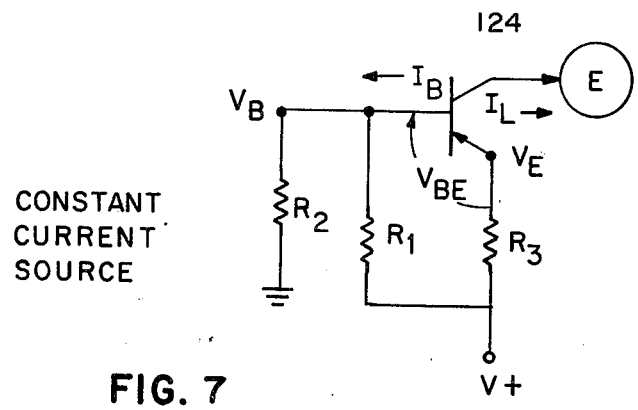
FIG. 7 is a schematic illustration of the constant current source for the bank of comparator elements shown in FIG. 8.

Maximum comparator 22 is identical to minimum comparator 18, including n comparator elements illustrated by FIG. 8, and a constant current source illustrated by FIG. 7. That is, identical circuitry may be used in the minimum and maximum comparators. The maximum negative output of voltage followers 152 determines the output of the maximum comparator, where previously, the minimum comparator obtained the minimum positive from among the outputs of absolute value elements 16. Since comparator circuitry may operate over both positive and negative ranges, identical circuitry may be used for both comparators.

Comparators 18 and 22 operate in response to input speech for selection of an inverse filter that is a closest match to the vocal tract. Minimum comparator 18 responds instantaneously to the rectified filter outputs, denominating the best match inverse filter at every instant of time. Maximum comparator 22 operates at an articulatory rate and responds to the dominant matched inverse filter, thereby producing an output representing and identifying the hypothetical vocal tract in which the input signal was originated.

The minimum comparator has a single recognition criterion: it must instantaneously select from among the outputs of inverse filter and attenuator channels the one channel having smallest absolute value signal. Normalization in the form of calculated weights applied to the filter bank output is not required in a system according to the model of speech recognition upon which the present invention is based. That this is true may be simply shown as follows.

A single vocal tract source impulse may be represented as i(t) in the time domain, and I(f) in the frequency domain. The vocal tract filter of the model of speech production given by H(f), and the matched inverse filter $H_I(f)$ of the model of speech recognition combine to form an all-pass filter, therefore $$I(f) \cdot H(f) \cdot H_I(f) = I(f)$$

and the inverse Fourier transform is given by $F^{-1}[I(f)] = i(t)$. This implies normalization in the sense that i(t) is recovered wits its original magnitude in the ideal model.

In a practical system operating on real speech, there would be a constant K applied representing attenuation due to distance from the mouth to the microphone, and could include amplification introduced in the recognizer input. A delay Y, would also occur due to propagation time from lips to microphone. As a result, the recovered impulse would be more precisely represented as $i'(t) = Ki(t-\tau)$. For instantaneous comparison among the n channels, K and $\tau$ have the same effect over all channels, therefore do not influence the determination of the inverse filter providing smallest instantaneous absolute value.

The operation of minimum comparator 18 may be viewed as the instantaneous selection, from among the n outputs of absolute value circuits 16, of the channel having minimum voltage level. This corresponds to the selection, from among the n inverse filter channels of the one channel having smallest absolute instantaneous signal level.

Operation of the maximum comparator 22 and the sampler 21 comprises the comparison, selection, and identification of the largest from among the integrated outputs of minimum comparator 18 within a timed interval suitable for representing articulation. More precisely, comparator 22 selects from among the n integrator signals the highest one which exists at the end of the interval.

The disclosed articulatory speech recognition apparatus is intended for use to provide input to higher levels of processing. Its outputs are in the form of category decisions regarding waveform activity within timed segments. The maximum decision circuit element 22 makes a series of such decisions based upon this waveform activity alone and without regard to any decisions made outside the interval. Decisions are articulatory in the sense that they identify articulatory characteristics, however they do not take into account any waveform data or decision information spanning any neighboring elements. Operation of this nature may be applied to the output of the present system, however, such operations are not included in the present application for patent.

Maximum comparator input signals are held constant over essentially the articulatory interval in the form of charge on capacitors 150 of FIG. 10, said charge updated through analog switch elements 148 (also of FIG. 10) operated by narrow transfer pulses, thereby transferring the total integrator output to capacitor 150 before the integrator is reset to begin the next articulatory interval. Voltage across capacitor 150 appears in low impedance form at the output of voltage follower 152. Since all inputs are steady between transfer pulses, comparator 22 output does not change except during transfer pulses. The decision output therefore remains fixed for a time sufficient for later transfer and utilization in higher levels of processing and recognition.

Decision circuits according to the subject invention are for the determination and identification from a bank of inverse filters which one is a best match (in the inverse sense) to the vocal tract, such determination made on an interval suitable for representing articulation. Best match is on the basis of best recovery of source impulses, since the effective vocal tract and its inverse filter correspond to an all-pass filter.

The two-level decision represented by comparators 18 and 22 with associated circuitry comprises a "time dominance" method for approximating best recovery of source impulses. Best recovery of source impulses is indicated by sensing the absence of waveform activity between recovered narrow impulses, and minimizing response contributed in the vicinity of recovered impulses themselves.

The decision method takes advantage of the short duration and high peak of recovered source impulses. Time dominance is ascertained by first making instantaneous comparisons therefore eliminating both overall intensity and changes in intensity with time from the decision process. Decisions made in the vicinity of recovered impulses contribute only minimally to the articulatory decision, said contribution being in proportion to time only, and not the product of intensity and time as would be done by direct integration of absolute value circuit outputs and application to a minimum decision circuit.

In addition to the foregoing implementation of circuitry of absolute value circuits 16, minimum comparator 18, integrator 20, and maximum comparator 22, there are equivalent methods utilizing analog-to-digital conversion and digital processing. Elements of these alternative implementations are disclosed as follows:

Analog-to-digital conversion may be applied to the outputs of inverse filters 12 or absolute value circuits 16. In the former case, absolute values are taken digitally by well-known digital methods. In the analog-to-digital conversion process, low-pass filtering is applied as dictated by the well-known sampling theorem. Input frequencies to the analog-to-digital conversion process are thereby restricted to be less than half of the sampling rate. Typically, speech frequencies above 5 KHz may be suppressed, and a 10 KHz sampling rate may be used.

One analog-to-digital converter module may be used for each channel, or multiplexing may be utilized by which a single A/D module converts more than one channel to digital form; in fact, a single fast-operating A/D converter may be multiplexed to convert all inverse filter channels to digital form. The remaining description is based on one A/D for each channel, but equivalence to a multiplexed system should be borne in mind.

There are two primary operations required of either an analog or a digital implementation, (a) instantaneous determination of channel having minimum absolute value signal, typically at a 10 KHz rate, and (b) selection of channel which is most often a minimum within an interval representing articulation, typically at a 100 Hz rate.

Instantaneous determination of minimum channel may be done by fast digital processing methods. Within a single interval of the sampling signal (typically 100 microseconds), the digital representations of all channels are scanned to find the smallest signal, and its channel thereby identified and denominated. The process is repeated for each sample interval, therefore a minimum channel is identified for each sampling interval.

The above channel identity data is used as input to further digital processing means for selection of the channel which is most often a minimum within an interval representing articulation, typically 10 milliseconds (typically 100 sample intervals). The selection process may be understood as a bank of counters, one for each inverse filter channel, such that the total number of minimum channel identifications in each channel is ascertained over a defined clock interval (typically 10 milliseconds or 100 sample intervals). At the end of the articulatory interval, one counter contains the largest count, thereby denominating the particular articulatory category.

Figure 12A:
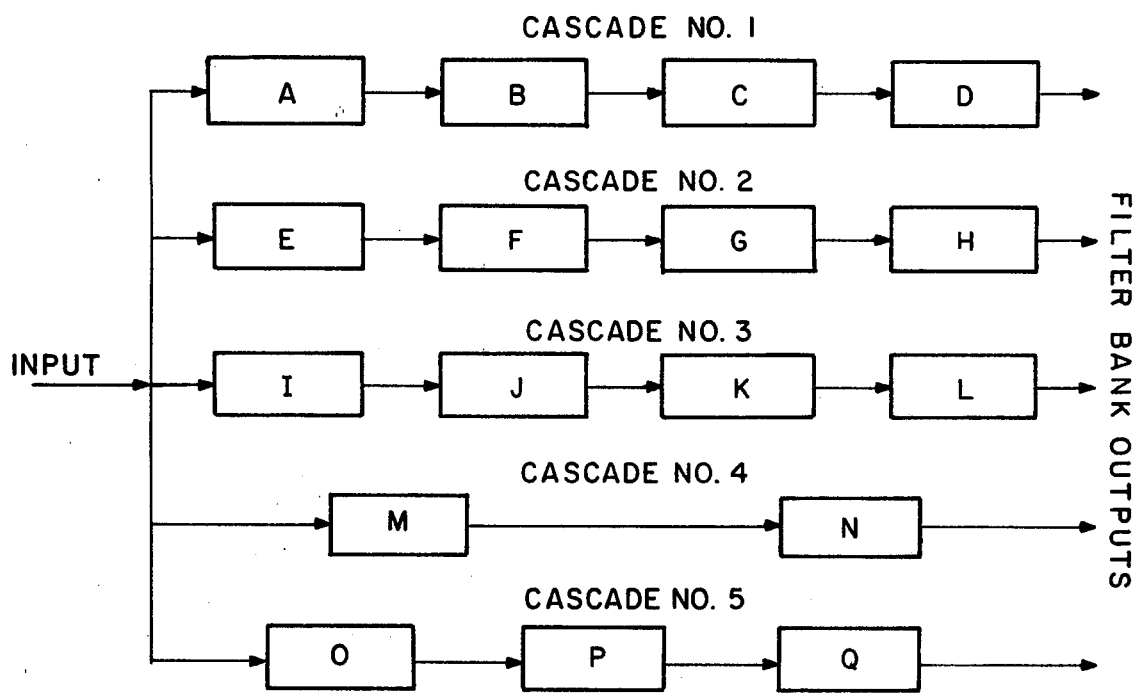
FIGS. 12A-B shows the multiple use of certain formant inverse filters when the same formant applies to more than one speech sound in a preferred implementation of the invention as shown in FIG. 1.
Figure 12B:
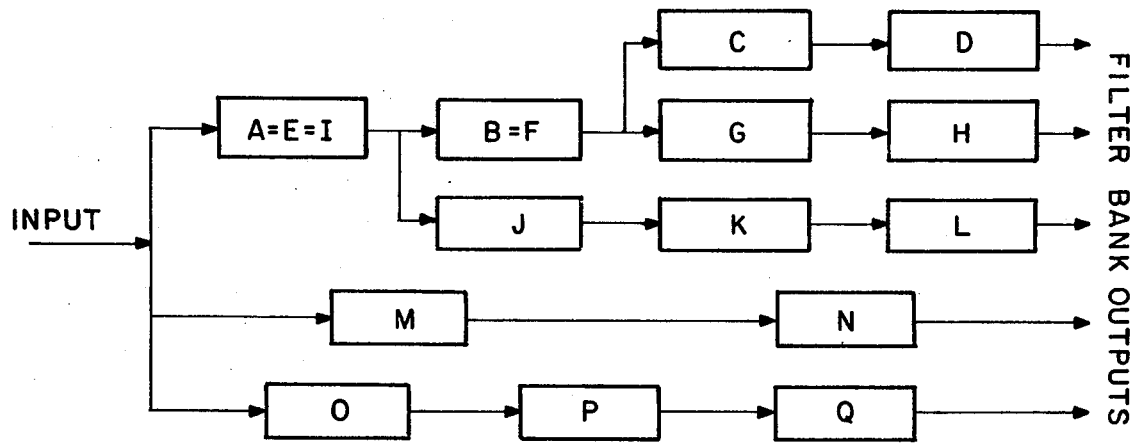

FIGS. 12A–B illustrate a method of reducing overall cost and complexity in construction of a bank of inverse filters. Certain pairs of speech sounds may have a common formant, and in some cases one formant inverse filter may serve as a member of both cascades. In FIG. 12A a bank of five independent filter cascades is shown.

In FIG. 12B, however, the equivalent is shown for the case in which certain inverse filters are equal, namely, A=E=I, and B=F. It is clear that some saving in complexity results from the multiple use of certain formant filters where this is possible.

The present invention is believed to be a substantial advancement in the art of speech recognition, since it can deal with the multiplicity of different waveform representations of a speech sound due to differences in vocal pitch and can operate with virtual independence of the vocal pitch. In recognizing a continuous stream of phonetic elements it is noted that only some of these elements are the sustainable phonemes associated with each of the filter channels. Since the described mode will select some one filter channel for any set of frequencies for each 10 millisecond interval, the invention has a sensitive capacity for identifying the characteristic vocal gestures associated with consonant and vowel transitions in terms of not only the sequence but the duration of the channels so selected. The apparatus is therefore capable of being utilized to generate pitch independent translation logics relating experimentally determined sequences of channels and channel durations to elements of speech sounds other than the sustained phonemes. It is believed that the present invention will contribute in the realization of practical systems for speech recognition, bandwidth compression and applications thereof.

It is to be understood that the above described embodiments are merely illustrative of numerous potential embodiments which may be constructed without departing from the spirit and scope of the following claims.

I claim:

1. An apparatus, for the classification of speech according to successive articulatory conditions thereof and substantially independent of the pitch thereof, comprising:
   a bank of electronic filters, in which:
      the input of each filter is connected to a common input for connection to an electrical signal representing the speech to be classified;
      each electronic filter is designed to have a transfer function that approximates the inverse of the complex transfer function of one articulatory condition of a vocal tract, whereby input into such filter of a non-zero signal representing the specified articulatory condition produces an output from such filter approximating a series of one or more source impulses and approximating zero output between such impulses;
   a comparator for determining repeatedly which of the filters has the best recovery of source impulses over successive durations that are sufficiently short so as to involve the filter's response to a speech signal representing the presence of only one articulatory condition, said comparator including means for determining instantaneously which of the filters has the smallest absolute value output in response to a speech signal input, said means for determining instantaneously which of the filters has the smallest absolute value output in turn including a bank of amplifying devices wherein:
      each amplifying device (such as a transistor) comprises an input element (such as a base), an element common to the input and the output (such as an emitter), and and output element (such as a collector), the current through the output element is a function of the voltage on the input element with respect to the common element;
      all common elements of the amplifying devices in the bank are connected to a constant current source;
      each input element is connected to a filter channel output signal to be compared;
      so that the output element contains a signal indicative of whether a given amplifying device is conducting and therefore receiving on its input element the minimum of the signals being compared.

2. The apparatus of claim 1, further comprising a second amplifying device, associated with each amplifying device and connected so as to provide positive feedback to it.

3. The apparatus of claim 1, in which the comparator further comprises a rectifier circuit associated with each input to the comparator, to determine the absolute value of each input.

4. An apparatus, for the classification of speech according to successive articulatory conditions thereof and substantially independent of the pitch thereof, comprising:
   a bank of electronic filters, in which:
      the input of each filter is connected to a common input for connection to an electrical signal representing the speech to be classified; and
      each electronic filter is designed to have a transfer function that approximates the inverse of the complex transfer function of one articulatory condition of a vocal tract, whereby input into such filter of a non-zero signal representing the specified articulatory condition produces an output from such filter approximating a series of one or more source impulses and approximating zero output between such impulses;
   a comparator for determining repeatedly which of the filters has the best recovery of source impulses over successive durations that are sufficiently short so as to involve the filter's response to a speech signal representing the presence of only one articulatory condition, said comparator including means for determining instantaneously which of the filters has the smallest absolute value output in response to a speech signal input;
   means for repeatedly determining, over a predetermined clock interval, which of the filters has the smallest absolute value output for the greatest total time, including:
   a bank of capacitors;
   means for supplying to each such capacitor a constant charging current when the channel is active, otherwise zero;
   means for temporarily storing the voltage across each such capacitor at the end of a predetermined clock interval;
   means for discharging the capacitors at the end of each clock interval after the voltage thereon has been stored; and
   means for determining which capacitor had the highest voltage on it at the end of each clock interval.

5. The apparatus of claim 4, in which the clock interval is approximately 10 milliseconds.

6. The apparatus of claim 4, in which the means for determining which capacitor had the highest voltage on it at the end of each clock interval comprises a bank of amplifying devices wherein:
- each amplifying device (such as a transistor) comprises an input element (such as a base), an element common to the input and the output (such as an emitter), and an output element (such as a collector), the current through the output element is a function of the voltage on the input element with respect to the common element;
- all common elements of the amplifying devices in the bank are connected to a constant current source;
- each input element is connected to a stored signal to be compared;
- so that the output element contains a signal indicative of whether a given amplifying device is conducting and therefore receiving on its input element the maximum of the capacitor voltages being compared.

7. The apparatus of claim 1 further comprising:
- means for sensing the presence of sound input;
- means for disabling all filter channel outputs when there is no sound input sensed by the sound input sensing means; and
- means for producing an output signal at any instant when there is no sound input sensed by the sound input sensing means.

8. The apparatus of claim 1, further comprising means for automatic control of the level of the speech signal prior to input to the bank of filters.

9. The apparatus of claim 1, in which each filter comprises a cascade of at least one formant antiresonance filter.

10. The apparatus of claim 1 or 4 in which the bank of electronic filters comprises:
- formant antiresonance filters; and
- means for adjusting simultaneously all formant frequencies and bandwidths in such formant antiresonance filters in the same proportion to permit the apparatus to conform to the vocal tract characteristics of a given class of speakers.

11. The apparatus of claim 9, in which a given formant antiresonance filter is used in connection with more than one filter channel in the bank of filters.

12. The apparatus of claim 4, in which the means for determining instantaneously which of the filters has the smallest absolute value output comprises a bank of amplifying devices wherein:
- each amplifying device (such as a transistor) comprises an input element (such as a base), an element common to the input and the output (such as an emitter), and an output element (such as a collector), the current through the output element is a function of the voltage on the input element with respect to the common element;
- all common elements of the amplifying devices in the bank are connected to a constant current source;
- each input element is connected to a filter channel output signal to be compared; and
- so that the output element contains a signal indicative of whether a given amplifying device is conducting and therefore receiving on its input element the minimum of the signals being compared.

13. The apparatus of claim 12, in which the means for determining which capacitor had the highest voltage on it at the end of each clock interval comprises a bank of amplifying devices wherein:
- each amplifying device (such as a transistor) comprises an input element (such as a base), an element common to the input and the output (such as an emitter), and an output element (such as a collector), the current through the output element is a function of the voltage on the input element with respect to the common element;
- all common elements of the amplifying devices in the bank are connected to a constant current source;
- each input element is connected to a stored signal to be compared; and
- so that the output element contains a signal indicative of whether a given amplifying device is conducting and therefore receiving on its input element the maximum of the capacitor voltages being compared.

14. The apparatus of claim 13, in which the comparator further comprises a rectifier circuit associated with each input to the comparator, to determine the absolute value of each input.

15. The apparatus of claim 14, further comprising a second amplifying device, associated with each amplifying device and connected so as to provide positive feedback to it.

16. The apparatus of claim 15 further comprising:
- means for sensing the presence of sound input;
- means for disabling all filter channel outputs when there is no sound input sensed by the sound input sensing means; and
- means for producing an output signal at any instant when there is no sound input sensed by the sound input sensing means.

17. The apparatus of claim 16, further comprising means for automatic control of the level of the speech signal prior to input to the bank of filters.

18. The apparatus of claim 17, in which the clock interval is approximately 10 milliseconds.

19. An apparatus, for the classification of speech according to successive articulatory conditions thereof and substantially independent of the pitch thereof, comprising:
- a bank of electronic filters, in which:
  - the input of each filter is connected to a common input for connection to an electrical signal representing the speech to be classified;
  - each electronic filter is designed to have a transfer function that approximates the inverse of the complex transfer function of one articulatory condition of a vocal tract, whereby input into such filter of a non-zero signal representing the specified articulatory condition produces an output from such filter approximating a series of one or more source impulses and approximating zero output between such inpulses;
- a comparator for determining repeatedly which of the filters has the best recovery of source impulses over successive durations that are sufficiently short so as to involve the filter's response to a speech signal representing the presence of only one articulatory condition, said comparator including means for determining instantaneously which of the filters has the smallest absolute value output in response to a speech signal input; and
- means for repeatedly determining, over a predetermined clock interval, which of the filters has the smallest absolute value output for the greatest total time.

20. The apparatus of claim 19, in which the clock interval is approximately 10 milliseconds.

* * * * *